(12) United States Patent
De Meerleer

(10) Patent No.: US 6,848,792 B1
(45) Date of Patent: Feb. 1, 2005

(54) FULL RESOLUTION MULTIPLE IMAGE PROJECTION SYSTEM AND METHOD FOR PROJECTING TWO IMAGES IN FULL RESOLUTION ADJACENT EACH OTHER

(75) Inventor: Peter De Meerleer, Oosterzele (BE)

(73) Assignee: Barco N.V., Kortrijk (BE)

( * ) Notice: Subject to any disclaimer, the term of this patent is extended or adjusted under 35 U.S.C. 154(b) by 0 days.

(21) Appl. No.: 10/330,943

(22) Filed: Dec. 27, 2002

(51) Int. Cl.$^7$ .................... G03B 21/26; G03B 21/00
(52) U.S. Cl. ........................ 353/30; 353/122
(58) Field of Search ..................... 353/122, 94, 30, 353/33; 348/839, 840; 345/1.3, 3.3, 3.4, 3.5

(56) References Cited

U.S. PATENT DOCUMENTS

| | | | | |
|---|---|---|---|---|
| 5,719,667 A | * | 2/1998 | Miers | 356/73 |
| 6,011,594 A | * | 1/2000 | Takashima | 348/565 |
| 6,473,130 B1 | * | 10/2002 | Kim | 348/565 |
| 6,493,008 B1 | * | 12/2002 | Yui | 345/840 |
| 6,616,282 B2 | * | 9/2003 | Ozawa | 353/33 |
| 2002/0021260 A1 | * | 2/2002 | Meguro | 345/1.3 |
| 2003/0020757 A1 | * | 1/2003 | Aratani et al. | 345/790 |

* cited by examiner

Primary Examiner—Russell Adams
Assistant Examiner—Andrew Sever
(74) Attorney, Agent, or Firm—Barnes & Thornburg LLP

(57) ABSTRACT

The present invention provides a projection device (10) which comprises:

- at least two high resolution input channels (12, 14) for receiving a first and a second high resolution input signal (20, 22) having information data for a first and a second display format, respectively,
- an image recombination system (24) for combining the high resolution input signals (20, 22) into one high resolution imaging signal having information data for a third display format larger than either of the first or second display formats,
- a high resolution image forming display device (18) for displaying an image corresponding to the high resolution imaging signal, and
- a projection lens (26) for projecting the imaged high resolution imaging signal onto a visualization surface (16).

The present invention also provides a corresponding method.

Due to the use of one large image forming display for displaying the two images, no geometrical alignment problem occurs. Because one single light beam is used for illuminating the one large image forming device, no colour non-uniformity problem occurs between the two images.

16 Claims, 1 Drawing Sheet

FULL RESOLUTION MULTIPLE IMAGE PROJECTION SYSTEM AND METHOD FOR PROJECTING TWO IMAGES IN FULL RESOLUTION ADJACENT EACH OTHER

TECHNICAL FIELD OF THE INVENTION

The present invention relates to a projection device and a method for projection of a plurality of images adjacent each other onto a visualisation surface such as a screen. More particularly it relates to a projection device and method for projection of a plurality of images at full resolution, especially using fixed format display devices.

BACKGROUND OF THE INVENTION

Projection technology is becoming wide spread thanks to rapid technology evolution and more efficient production techniques. Reference is made to the book "Projection Displays", E. H. Strupp and M. H. Brennesholtz, Wiley, 1999.

Current commercially available projectors can only project one computer or data image in its native resolution if it is a high resolution image such as for example SVGA (Super VGA or Super Video Graphics Array or Adaptor, 800*600 pixels), XGA (Extended Graphics Array or Adaptor, 1024*768 pixels), 16:9 HDTV standard format (1280*720 pixels), SXGA (Super XGA, 1280*1024 pixels), Wide XGA (1365*768 pixels), SXGA+ (1400*1050 pixels), UXGA (Ultra XGA, 1600*1200 pixels), 16:9 HDTV standard format (1920*1080 pixels), 16:10 widescreen PC displays (1920*1200 pixels), 16:9 European HDTV format (2048*1152 pixels) or Quad XGA (2048*1536 pixels).

Reference is made to the book "Display Interfaces", R. L. Myers, Wiley, 2002, for explanation of these terms.

When it is desired to project multiple computer or data images on one screen in native resolution, e.g. images from two laptop computers in order to be able to compare them, then often one projector per displayed image is used. This solution is expensive because of the cost of supplementary projectors. Furthermore, it brings along additional problems, the most important of which are geometrical alignment of the different images and colour adjustment of these images projected by different projectors.

The geometrical alignment forms a problem because each projector has its own projection lens with its own geometrical aberrations or distortions. Projecting a plurality of such distorted images adjacent each other always involves some bad alignment, as represented for example in FIG. 1, which shows two images 2, 4 projected adjacent each other onto a projection surface 6 by two different projectors. Each of the images 2, 4 is distorted.

The book by Myers above proposes a hypothetical solution to the problem of displaying images of different resolution on a single display by means of conditional updating. That is each sub-image has to be updated separately rather than the complete screen as an entity.

When images of different projectors are combined, furthermore these images need to be colour adjusted so that originally colour matched images look the same, since the projected image of each projector has a slightly different colour point and colour uniformity. Even with the best possible known colour compensation schemes, one can always notice a visible difference.

Because of colour drift of projectors over time, this difference can get bigger over time.

A solution for these problems has been proposed by a device according to U.S. Pat. No. 5,153,621. With this device, a pair of discrete images are disposed in adjoining relation on a view screen to form a single image thereon with minimal or no illuminance discontinuity at their juncture. To accomplish this, there is provided a light source, a condensing lens, a mirror system, a pair of discrete image displays, and a projection lens. The lens and mirror system project light rays from the source along discrete optical paths for passage separately through each image display. A single projection lens defining an optical axis is provided for projecting the images in adjoining relation on a view screen. Interposed between the image displays and the projection lens is an optical system including a lens and mirror for combining the light rays passing through the image displays along discrete optical paths for passage through the projection lens such that a single image combining the images from the discrete image displays in substantially seamless adjoining relation is formed on the view screen.

The above device has the disadvantage that the two image displays need to be aligned very accurately. It is known that such mechanical adjustments of two image displays, LCD panels for example, diverge under temperature cycling circumstances. Furthermore, if the characteristics of the image displays for forming the adjacent projected images are different, then a join seam becomes visible on the screen. This join seam is caused by a difference between the characteristics of the image displays, and accordingly the quality of the projected image deteriorates. Making two exactly identical image displays is difficult (in reality impossible) due to process differences. This is especially true for grey levels on the image displays, such as LCD's for example. Furthermore, the seam is also visible because the light beam is split into two parts, one for each panel, resulting in illuminance and colour non uniformity.

SUMMARY OF THE INVENTION

It is an object of the present invention to provide a full resolution multiple image projection system for projecting two or more discrete images adjacent each other onto a viewing surface without substantial illumination discontinuities or image distortions between both images, and with both images having their full, native resolution.

The above objective is accomplished by a method and device according to the present invention.

The present invention provides a projection device. Such projection device comprises:

at least two input channels for receiving a first and a second input signal of, for instance, a first and second image format, respectively and, for example, each having information data, e.g. blanking periods, for a first and a second display format, respectively, an image recombination system for combining the input signals into one imaging signal having, for example, a third resolution and having, for example, information data for a third display format larger than either of the first or second display formats, the third image format being, for example, the summation of at least the first and second image formats, an image forming display device for displaying an image corresponding to the imaging signal, and a projection lens for projecting the imaging signal onto a visualisation surface.

The first and second image formats may be the same and the first and second display formats may be the same.

The image forming display device may comprise a number of monochromatic image forming display devices which in combination form a projected coloured image. The image forming display may be made up of one or more fixed format devices. Due to the use of one large image forming display for displaying the two images, the problem of geometrical alignment, which existed in the prior art solutions, is solved. The reason for this is that as the two images are combined together to form a single array, the dividing line between the two images is selectable on a pixel-by-pixel basis. Once the dividing line is determined the image will project in the same way at all times as the dividing line is set into the fixed format of the display device. Also the colour non-uniformity problem is solved, because one single light beam is used for the two images.

The first and second display formats may be the same, or they may be different. They may have the same or a different frame rate. The frame rate of the third display format may be the same as that of either of the first of second display formats, or it may be different from both. The third frame rate is preferably a single frame rate for the complete image thus avoiding the necessity for conditional updating.

The image forming display device may be a wide aspect ratio panel, e.g. a flat panel display. It may be a transmissive display such as e.g. an LCD panel, or a reflective display such as e.g. a DMD or an LCOS, or a transreflective display.

The image recombination system may comprise a Field Programmable Gate Array or other similar computing device.

The input signals may be high resolution input signals, e.g. they may have a resolution SVGA or higher.

The present invention also provides a projection system with a projection device and a visualisation surface. The projection device of such projection system comprises:
at least two input channels for receiving a first and a second input signal having, for example, a first and second image format, respectively and each signal having, for example, information data for a first and a second display format, respectively,
an image recombination system for combining the input signals into one imaging signal having, for example, information data for a third display format larger than either of the first or second display formats and, for example, having a third image format which is the summation of at least the first and second image formats,
an image forming display device for displaying an image corresponding to the imaging signal, and
a projection lens for projecting the imaging signal onto the visualisation surface.

The first and second image formats may be the same and the first and second display formats may be the same.

The present invention furthermore provides a method for projecting two high resolution images adjacent each other. The method comprises:
providing at least a first and a second input signal having, for example a first and second image format, respectively, and having, for example, information data for a first and a second display format, respectively, combining the two input image signals into one imaging signal having, for example, information data for a third display format larger than either of the first or second display formats and, for example, having a third image format which is at least the summation of the first and second image formats, applying the imaging signal to a image forming display device, so as to obtain an intensity-modulated light beam corresponding to the imaging signal, and projecting the intensity-modulated light beam onto a projection surface.

The first and second image formats and the first and second display formats may be the same.

These and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DESCRIPTION OF ILLUSTRATIVE EMBODIMENTS

Figure 1:
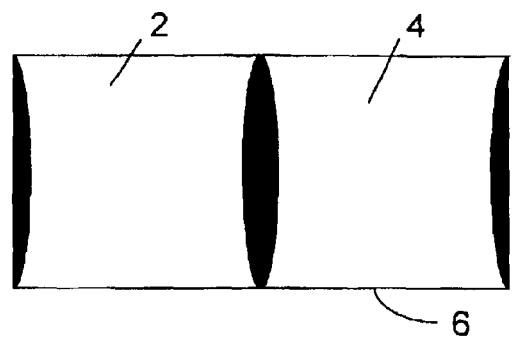
FIG. 1 is a schematic front view of adjacent images projected by two different projectors according to the prior art.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps.

The present invention provides a single projection system that may comprise one or more projection devices and that has at least two input channels 12, 14, preferably high resolution input channels. The projection device is able to capture high resolution input signals relating to two full resolution data or computer images. The term "resolution" in the context of display interfaces is often used to refer to the "image format" or "adressibility", i.e. the horizontal and vertical pixel count in a fixed format device. Thus, in the attached claims the term "image format" refers what is called "resolution" in the art, i.e. the number of pixels in the vertical and horizontal direction. The term "display format" includes not only the image format but also other information required to display the image, e.g. the frame rate, the blanking periods. Each image signal has information relating to the length of the lines of the image as well as information from which it can be decided which parts of the image signals are image pixels to be displayed. This type of information is contained in the image signals received on the first and second channels and can be, for example, blanking periods for a first and second display format, respectively. The first and second display format may be the same. A complete video signal, whether analog or digital, includes information corresponding to the image itself, but also generally has additional "overhead" requirements. In the situation of an analog video signal, the "overhead" is in the blanking period, i.e. that portion of the signal that is intentionally left free of active content, or of information corresponding to a part of the image itself. The requirement for such periods is imposed by the needs of the various imaging and display hardware technologies, which must have some idle time between each scanned line and frame or field in order to reset and prepare for the next. The blanking period almost always contains the signals which provide synchronisation information to the display—those pulses or signals which identify the start of a new line, field or frame. It is common, then, to divide the overall blanking period into three sections. The period prior to the synchronisation pulse is the "front porch". The remainder of the blanking period is then divided into the sync pulse itself and the "back porch" (which is any remaining blanking time following the end of the sync pulse). It is common in analog video signal and timing standards to use either the beginning of the blanking period or the beginning of the sync pulse itself as the reference point from which the rest of the line or frame timing is defined. In the case of digital video systems, there is often no need for an explicit blanking period, as the information will be placed in a digital storage and/or further processed before being delivered to the display itself. However, many "digital" video systems and standards are based on the assumption that an analog signal will be "digitised" in order to create the digital data stream, and so include definitions of the blanking period, sync pulse position, etc., in terms of the sample or pixel period. Doing away with such things entirely, and treating the image transmission as if it were any other digital data communication, is generally not done. In cases where it is not done, the "overhead" will be in an information data part of the image signal, which for example defines the number of pixels per line for the image, and/or the frame rate, i.e. the number of images that are displayed per second. This information data then refers to the image format. In the present document, the term "information data" is used both for analog and digital image signals, and thus includes either blanking periods or other information data relating to the way the image format is to be displayed on a particular device. This is to be distinguished from "image data" that contains he information with respect to each image pixel to be displayed.

The table below provides a list of image and display formats as well as details of timing specifications.

| Format | Htotal | H FP | HS | H BP |
|---|---|---|---|---|
| VGA 640 × 480 | 800 | 16 | 96 | 48 |
| SVGA 800 × 600 | 1056 | 40 | 128 | 88 |
| XGA 1024 × 768 | 1344 | 24 | 136 | 160 |
| 16:9 HDTV 1280 × 720 | 1650 | 70 | 80 | 220 |
| SXGA 1280 × 1024 | 1688 | 48 | 112 | 248 |
| UXGA 1600 × 1200 | 2160 | 64 | 192 | 304 |
| 16:9 widescreen 1920 × 1080 | 2200 | 45 | 88 | 148 | wherein Htotal is the total duration of one line, in pixels,

H FP is the horizontal "front porch" duration, in pixels,

HS is the horizontal sync pulse duration, in pixels, and

H BP is the horizontal "back porch" duration, in pixels.

It can be seen from the table above that different blanking periods are provided for different display formats, i.e. images have a blanking period suitable for a certain display format.

Figure 2:
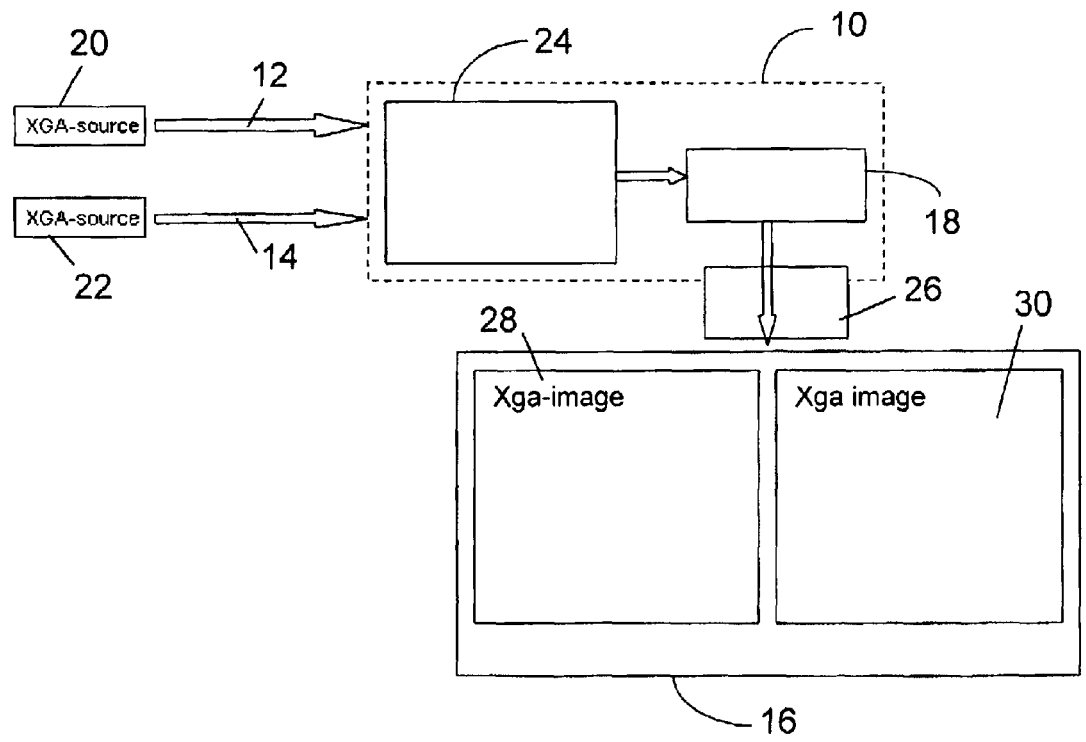
FIG. 2 is a block schematic diagram of a projection system according to an embodiment of the present invention.

A projection device 10 according to the present invention is able to display these data or computer images in native resolution or otherwise next to or adjacent each other, as shown in FIG. 2, and therefore has an image recombination system 24 for combining the high resolution input signals 20, 22 into one high resolution imaging signal having data information, e.g. blanking periods, for a third display format larger than either of the first or second display formats, and a high resolution image forming display device 18 for displaying an image corresponding to the high resolution imaging signal. With "high resolution" is meant having four hundred thousand pixels or more, preferably one million pixels or more, more preferred two million pixels or more. The projection device 10 may comprise more than one monochromatic projection devices, e.g. three such devices for projection three primary colour images. In accordance with the present invention the combination of the two input images is displayed from each monochromatic projection device. The three images are superimposed on a display screen to form a single full-colour image which comprises the two input images in the same resolution. The display devices may be fixed format display devices, e.g. flat panel devices and may include tiled displays.

The present invention also provides a projection system, comprising a projection device 10 and a visualisation screen 16.

As an example, a projection system according to the present invention may comprise a fixed format projector, e.g. a flat panel projector such as an LCD projector as a projection device 10. Such an LCD projector may have three image forming display devices 18, e.g. the LCD projector may be a three-panel (one panel for each colour) LCD projector, wherein each panel has a "resolution" of e.g. 2050*1208 pixels. This corresponds to the resolution of two standard XGA panels next to each other. The aspect ratio of the image forming display devices 18, e.g. LCD panels, may be larger than the aspect ratio of a normal image forming display device, e.g. LCD panel, for example the aspect ratio may be 16:9 or 16:10 instead of 4:3. The projection device may be, but does not need to be, a two-lamp projector, which fits better with the 16:9 or 16:10 aspect ratio of the image forming display devices 18. Thanks to the resolution of the image forming display panels 18, in the example given it is possible to display two native XGA-sources of each 1024*768 pixels next to each other simultaneously without the need for two projectors. In such a case the frame rate for the complete image is the same all over the image.

Up to now, there was a technical prejudice against using larger image forming display devices 18, e.g. LCD panels, because they are difficult to make, which decreases the production yield and thus makes the display devices 18 more expensive. This technical prejudice has been expressed a.o. in U.S. Pat. No. 5,300,966, more specifically col.1 line 66 to col.2 line 5 thereof. Therefore, generally prior art solutions for projecting multiple images adjacent each other deviate from the present invention which uses a high resolution image forming display device 18.

In order to achieve the display of two native high resolution images adjacent each other, special electronics are needed. The electronics inside the projection device 10 are capable of handling two or more separate data streams 20, 22 and of combining them in full resolution in an image recombination system 24 into one image format that is then sent to the image forming display device 18 inside the projection device 10, as shown on the example in FIG. 2.

The data streams or input signals 20, 22 may for example be analog R, G, B, H, V signals or digital OVI-signals or equivalent with a resolution of VGA, SVGA, XGA or higher.

The image recombination system 24 may function as follows: each image 20, 22 is presented to the image recombination system 24 as a datastream comprising consecutive lines of the images 20, 22. The recombined image comprises, for each $n^{th}$ line, data from the $n^{th}$ line of the first image 20 and data from the $n^{th}$ line of the second image 22. This combination of lines of data from the separate images 20, 22 into lines of data of the combined image is made inside the image recombination system 24. Basically, the two image formats are combined into 1 bigger image format, which is presented to the display. The whole screen is continuously and real time updated, so the update is not conditionally, i.e. the update is not for parts of the display only. The frame rate of the combined image that is fed to the display will usually be (but does not need to be) synchronous with the frame rate of 1 of the two inputted formats, for example with the frame rate of the first image format. If the second image format has a different frame rate, this second image format will be frame rate converted to match the frame rate of the first image format and of the combined image format that is combining both images for the display. Thus one or each input channel of the projection device of the present invention may include a frame converter, e.g. in block 24. It is possible that the combined image format is running asynchronously from both inputted image formats, in which case both inputted formats are frame rate converted using a frame converter to match the frame rate of the combined image format that is fed to the display. After both inputted image formats are frame rate matched to the combined image format that will be sent to the display, combining the pixel data of both images into the combined image format creates the combined image data. Basically the pixel data of each individual input image is mapped to the correct position in the combined image, thereby recalculating the correct pixel position for all pixels of the combined image. In both cases, the combined image being synchronous or asynchronous with at least one of the images, both images are displayed at the same frame rate.

The electronic image processing system according to the present invention comprises a dual data line for computer or data images with a 1:1 resolution preservation, i.e. no downscaling nor upscaling of the image resolutions. At the end, both images are shifted into one big data image by image recombination techniques applied to the image signals in an image recombination system 24. The recombination of these two data streams may be done in an image recombination system 24 such as e.g. an Integrated Circuit (IC), an Application Specific IC (ASIC), or a Field Programmable Gate Array (FPGA), which combines both images e.g. into a 2050*1208-image format.

This 2050*1208-image format signal, for example, is then fed to the large image forming display device 18, e.g. LCD panel, and is projected onto the visualisation screen or projection screen 16 by means of a single projection lens 26. Because both images 28, 30 are projected by a single projection lens 26 in a single projection device 10, there is no risk of geometrical misalignment between the images 28, 30 because of geometrical distortion and neither for colour misalignment as is the case when one is using two separate projection systems next to each other as in the prior art.

The two images can be visually placed on the visualisation screen 16 either next to each other, horizontally, vertically or obliquely, or partially on top of each other.

With the present invention, it is also possible to combine different images of different native resolutions in one big image, e.g. SXGA+ and SVGA, XGA and SXGA, UXGA and XGA, and so on. The image processing electronics first measures characteristics of each of the inputted image signals 20, 22, such as for example resolution, blanking, total number of pixels, etc and then uses this data to accurately map the pixels of the inputted data files into the combined image format. If for example the first image comprises more lines than the second image, then blank lines (or black lines) may be added at the end of the second image when combining both images. Thus the image format of the final image may be greater than the sum of the image formats of the first and second images. Here again, the different images are displayed at the same frame rate in the final image.

The projection device 10 can be a single lamp system or a multiple lamp system, and it can display video images as well as data images. Alternatively, the illumination can also happen with laser sources.

It is to be understood that although preferred embodiments, specific constructions and configurations, as well as materials, have been discussed herein for devices according to the present invention, various changes or modifications in form and detail may be made without departing from the scope and spirit of this invention. For example, the image forming display device 18 inside the projection device 10 can be of a transmissive or reflective type, such as for example a polysilicon LCD, a DLP-chip, a DMD display, an LCOS device, a grating light valve display or an OLED display, as long as the resolution is sufficient for the application. The projection device 10 can either be a single display projector, a 2-display projector or a 3-display projector. The embodiments above have been explained for the combination of two images, but more than two images may be combined as well.

What is claimed is:

1. A projection device comprising:
    at least two high resolution input channels for receiving a first and a second high resolution input signal having information data for a first and a second display format, respectively, the first and the second display format comprising a first and a second image format respectively,
    an image recombination system for combining the high resolution input signals into one high resolution imaging signal having information data for a third display format, the third display format comprising a third image format the third image format being at least the summation of the first and second image formats,
    a high resolution image forming display device for displaying an image corresponding to the high resolution imaging signal,
    a projection lens for projecting the imaged high resolution imaging signal onto a visualisation surface.

2. A projection device according to claim 1, wherein the first and second display formats are the same.

3. A projection device according to claim 1 wherein the first and second input signals have a first and second image format, respectively and the high resolution imaging signal has a third image format which is larger than either the first or second image format.

4. A projection device according to claim 3, wherein the first and second input signals have the same image format.

5. A projection device according to claim 1, wherein the image forming display device is a wide aspect ratio flat panel device.

6. A projection device according to claim 1, wherein the image forming display device is an LCD panel.

7. A projection device according to claim 1, wherein the image recombination system comprises a Field Programmable Gate Array.

8. A projection device according to claim 1, wherein the high resolution input signals have a display format of SVGA or higher.

9. Projection system with a projection device and a visuaisation surface, the projection device comprising:
    at least two high resolution input channels for receiving a first and a second high resolution input signal having information data for a first and second display format, respectively, the first and the second display format comprising a first and a second image format respectively, an image recombination system for combining the high resolution input signals into one high resolution imaging signal having a information data for a third display format, the third display format comprising a third image format, the third image format being at least the summation of the first and second image formats, a high resolution image forming display device for displaying an image corresponding to the high resolution image signal, a projection lens for projecting the imaged high resolution imaging signal onto the visualisation surface.

10. The projection system according to claim 9, further comprising at least one frame rate converter for frame rate conversion of the first and/or second image input signal.

11. The projection system according to claim 9, wherein the first and second display formats are the same.

12. The projection system according to claim 9 wherein the first and second input signals have a first and second image format, respectively and the high resolution imaging signal has a third image format which is larger than either the first or second image formats.

13. The projection system according to claim 12, wherein the first and second input signals have the same image format.

14. A method for projecting two high resolution images adjacent each other, the method comprising:

providing at least a first and a second high resolution input signal having information data for a first and a second display format, respectively, the first and the second display format comprising a first and a second image format respectively, combining the two high resolution input image signals into one high resolution imaging signal having information data for a third display format, the third display format comprising a third image format, the third image format being at least the summation of the first and second image formats.

15. The method of claim 14, wherein the first and second display formats are the same.

16. The method of claim 14, wherein the first and second input signals have the same image format.

* * * * *